United States Patent
Yaguchi

(10) Patent No.: US 9,535,657 B2
(45) Date of Patent: Jan. 3, 2017

(54) VEHICLE AND METHOD FOR CONTROLLING VEHICLE

(75) Inventor: Hideaki Yaguchi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/009,717

(22) PCT Filed: Apr. 5, 2011

(86) PCT No.: PCT/JP2011/058580
§ 371 (c)(1),
(2), (4) Date: Oct. 3, 2013

(87) PCT Pub. No.: WO2012/137297
PCT Pub. Date: Oct. 11, 2012

(65) Prior Publication Data
US 2014/0025268 A1    Jan. 23, 2014

(51) Int. Cl.
*G06F 19/00*    (2011.01)
*G06F 7/00*    (2006.01)
(Continued)

(52) U.S. Cl.
CPC .............. *G06F 7/00* (2013.01); *B60K 6/445* (2013.01); *B60W 10/184* (2013.01); *B60W 20/00* (2013.01); *B60W 20/40* (2013.01); *B60W 30/18018* (2013.01); *B60W 30/18109* (2013.01); *B60W 50/10* (2013.01); *B60W 2540/06* (2013.01); *B60W 2540/12* (2013.01); *B60W 2540/16* (2013.01); *Y02T 10/6239* (2013.01)

(58) Field of Classification Search
CPC ........ G06F 7/00; B60K 6/445; B60W 10/184; B60W 20/00; B60W 20/40; B60W 30/18018; B60W 30/18109; B60W 50/10; B60W 2540/06; B60W 2540/12; B60W 2540/16; Y02T 10/6239
See application file for complete search history.

(56) References Cited

U.S. PATENT DOCUMENTS 5,948,035 A * 9/1999 Tomita ............................ 701/70
8,408,177 B2 * 4/2013 Nagoshi et al. ........... 123/179.4
(Continued)

FOREIGN PATENT DOCUMENTS

| JP | 2001-342868 | 12/2001 |
|----|-------------|---------|
| JP | 2008-75581 A | 4/2008 |

(Continued)

OTHER PUBLICATIONS

International Search Report of PCT/JP2011/058580, dated Jul. 12, 2011.

*Primary Examiner* — Tuan C. To
(74) *Attorney, Agent, or Firm* — Sughrue Mion, PLLC

(57) ABSTRACT

When a start switch is operated, and a vehicle is running, and a system of a vehicle is in an activated state, ECU executes a program including the steps of determining whether or not a brake is in an on-state, and shifting the system of the vehicle to a stopped state when the brake is in the on-state while an operation duration is equal to or greater than a threshold value Tc (0), or when the brake is in the off-state while the operation duration Tc is equal to or greater than a threshold value Tc (1) greater than threshold value Tc (0).

7 Claims, 10 Drawing Sheets

(51) Int. Cl.
   *B60K 6/445*   (2007.10)
   *B60W 10/184*  (2012.01)
   *B60W 20/00*   (2016.01)
   *B60W 30/18*   (2012.01)
   *B60W 50/10*   (2012.01)

(56) References Cited

U.S. PATENT DOCUMENTS

| | | | |
|---|---|---|---|
| 2002/0098941 A1* | 7/2002 | Minowa | B60K 6/547 477/5 |
| 2005/0203693 A1 | 9/2005 | Arai et al. | |
| 2009/0241883 A1 | 10/2009 | Nagoshi et al. | |
| 2011/0046864 A1* | 2/2011 | Kamiya | 701/102 |
| 2011/0136621 A1* | 6/2011 | Nedorezov et al. | 477/77 |
| 2011/0180031 A1* | 7/2011 | Hamane | 123/179.4 |
| 2011/0202234 A1* | 8/2011 | Bradley | B60K 6/48 701/36 |
| 2011/0266865 A1* | 11/2011 | Okabe et al. | 307/10.6 |
| 2012/0330505 A1* | 12/2012 | Tsumori | B60W 10/06 701/36 |
| 2013/0030647 A1* | 1/2013 | Shimasaki | B60L 1/02 701/36 |
| 2013/0210575 A1* | 8/2013 | Kumazaki | B60K 6/48 477/20 |
| 2013/0304358 A1* | 11/2013 | Matsunaga | F02D 41/00 701/110 |
| 2014/0236406 A1* | 8/2014 | Ishida | B60W 10/02 701/22 |
| 2014/0318294 A1* | 10/2014 | Kamada | F16H 61/32 74/473.12 |

FOREIGN PATENT DOCUMENTS

| | | |
|---|---|---|
| JP | 2009-231040 | 10/2009 |
| JP | 2009255924 A | 11/2009 |

* cited by examiner

VEHICLE AND METHOD FOR CONTROLLING VEHICLE

CROSS REFERENCE TO RELATED APPLICATIONS

This application is a National Stage of International Application No. PCT/JP2011/058580 filed Apr. 5, 2011, the contents of all of which are incorporated herein by reference in their entirety.

TECHNICAL FIELD

The present invention relates to control of a vehicle provided with a rotating electric machine and an internal combustion engine.

BACKGROUND ART

Japanese Patent Laying-Open No. 2008-075581 (PTD 1) discloses a technology for preventing continuous operation of an engine without presence of a driver during a period of delay in stopping the engine.

Further, in recent years, a hybrid vehicle equipped with a motor generator and an engine attracts attention as a measure for environmental problems.

CITATION LIST

Patent Document

PTD 1: Japanese Patent Laying-Open No. 2008-075581

SUMMARY OF INVENTION

Technical Problem

When a driver performs operation of activating or stopping a system during running, the system of a vehicle 1 is preferably activated or stopped in a prompt manner in accordance with the intention of the driver. However, in some cases, the intention of a driver cannot be assessed properly from just a state of an operating unit for giving an instruction to activate or stop the system.

An object of the present invention is to provide a vehicle and a method for controlling a vehicle to activate or stop a system in accordance with the intention of a driver during vehicle-running.

Solution to Problem

A vehicle in accordance with one aspect of the present invention includes a first operating unit to be operated to instruct a system of the vehicle to stop, a second operating unit to be operated to change a running state of the vehicle, and a controller for stopping the system when a determination condition for determining reception of an instruction to stop the system in accordance with an operational state of the first operating unit is satisfied. The controller modifies the determination condition in accordance with an operational state of the second operating unit when the first operating unit is operated during running of the vehicle, and stops the system when the modified determination condition is satisfied.

Preferably, the second operating unit includes a brake pedal. The operational state of the second operating unit includes a state where the brake pedal is pressed and a state where pressing on the brake pedal is released. The determination condition in the state where the brake pedal is pressed includes a condition that a duration of operation to the first operating unit is equal to or greater than a first threshold value. The determination condition in the state where pressing on the brake pedal is released includes a condition that the duration of operation is equal to or greater than a second threshold value. The second threshold value is greater than the first threshold value.

More preferably, the second operating unit includes a brake pedal. The operational state of the second operating unit includes a state where the brake pedal is pressed and a state where pressing on the brake pedal is released. The determination condition in the state where the brake pedal is pressed includes a condition that the number of operations to the first operating unit within a predetermined time period is equal to or greater than a first threshold value. The determination condition in the state where pressing on the brake pedal is released includes a condition that the number of operations is equal to or greater than a second threshold value. The second threshold value is greater than the first threshold value.

More preferably, the controller determines that the brake pedal is pressed when a force of pressing the brake pedal is greater than a predetermined value, and determines that pressing on the brake pedal is released when the force of pressing the brake pedal is less than the predetermined value.

More preferably, the second operating unit includes a shift lever for selecting any one of a plurality of shift positions including a running position and a neutral position. The operational state of the second operating unit includes a state where the running position is selected and a state where the neutral position is selected. The determination condition in the state where the running position is selected includes a condition that a duration of operation to the first operating unit is equal to or greater than a first threshold value. The determination condition in the state where the neutral position is selected includes a condition that the duration of operation is equal to or greater than a second threshold value. The second threshold value is greater than the first threshold value.

More preferably, the second operating unit includes a shift lever for selecting any one of a plurality of shift positions including a running position and a neutral position. The operational state of the second operating unit includes a state where the running position is selected and a state where the neutral position is selected. The determination condition in the state where the running position is selected includes a condition that the number of operations to the first operating unit within a predetermined time period is equal to or greater than a first threshold value. The determination condition in the state where the neutral position is selected includes a condition that the number of operations is equal to or greater than a second threshold value. The second threshold value is greater than the first threshold value.

A vehicle according to another aspect of the present invention includes a first operating unit to be operated to instruct a system of the vehicle to stop, a second operating unit to be operated to change a running state of the vehicle, and a controller for activating the system when a determination condition for determining reception of an instruction to activate the system in accordance with an operational state of the first operating unit is satisfied. The controller modifies the determination condition in accordance with an operational state of the second operating unit when the first operating unit is operated during running of the vehicle, and activates the system when the modified determination condition is satisfied.

More preferably, the second operating unit includes an accelerator pedal. The operational state of the second operating unit includes the number of operations with a degree of pressing on the accelerator pedal equal to or greater than a predetermined degree. The determination condition in the state where the number of operations is greater than a predetermined number includes a condition that a duration of operation to the first operating unit is equal to or greater than a first threshold value. The determination condition in the state where the number of operations is equal to less than the predetermined number includes a condition that the duration of operation is equal to or greater than a second threshold value. The second threshold value is greater than the first threshold value.

More preferably, the second operating unit includes an accelerator pedal. The operational state of the second operating unit includes a first number of operations with a degree of pressing on the accelerator pedal equal to or greater than a predetermined degree. The determination condition in a state where the first number of operations is greater than a predetermined number includes a condition that a second number of operations within a predetermined time period to the first operating unit is equal to or greater than a first threshold value. The determination condition in a state where the first number of operations is equal to or less than the predetermined number includes a condition that the second number of operations is equal to or greater than a second threshold value. The second threshold value is greater than the first threshold value.

A method for controlling a vehicle according to yet another aspect of the present invention is a method used for a vehicle including a first operating unit to be operated to instruct a system of the vehicle to stop, and a second operating unit to be operated to change a running state of the vehicle. The method for controlling a vehicle includes the steps of determining whether or not the first operating unit is operated during running of the vehicle, stopping the system when a determination condition is satisfied, the determination condition adapted for determining reception of an instruction to stop the system in accordance with an operational state of the first operating unit, and modifying the determination condition in accordance with an operational state of the second operating unit when the first operating unit is operated during running of the vehicle.

A method for controlling a vehicle according to yet another aspect of the present invention is a method used for a vehicle including a first operating unit to be operated to instruct a system of the vehicle to activate, and a second operating unit to be operated to change a running state of the vehicle. The method for controlling a vehicle includes the steps of determining whether or not the first operating unit is operated during running of the vehicle, activating the system when a determination condition is satisfied, the determination condition adapted for determining reception of an instruction to activate the system in accordance with an operational state of the first operating unit, and modifying the determination condition in accordance with an operational state of the second operating unit when the first operating unit is operated during running of the vehicle.

Advantageous Effects of Invention

According to the present invention, a determination as to whether or not a driver actively attempts to activate or stop the system of vehicle can be made in accordance with the operational state of the second operating unit. Therefore, the determination on reception of an instruction to activate or stop the system can be made promptly by changing the determination condition for determining whether or not the instruction to activate or stop is received in accordance with an operational state of the second operating unit. Therefore, a vehicle and a method for controlling a vehicle can be provided to stop a system in accordance with the intention of a driver during running of a vehicle.

DESCRIPTION OF EMBODIMENTS

Figure 1:
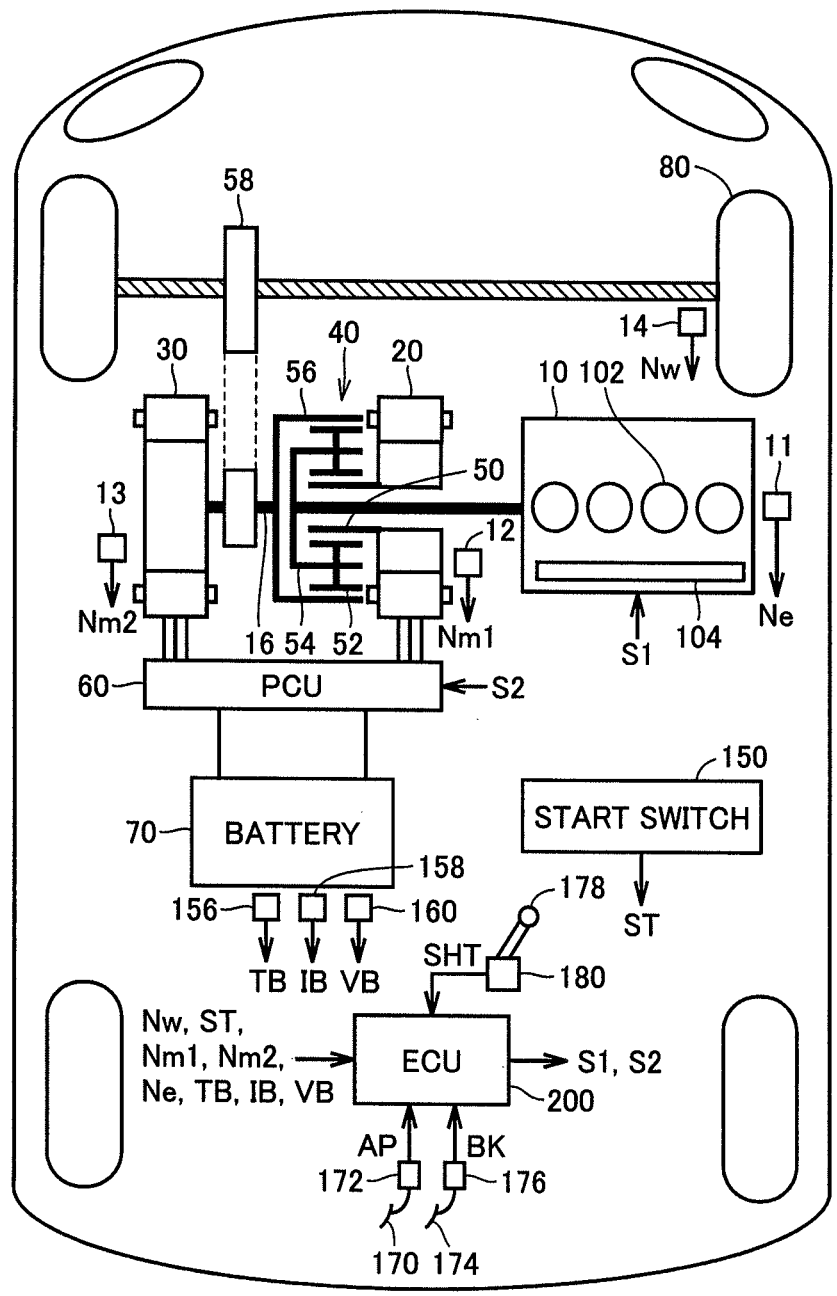
FIG. 1 is a block diagram representing an entire vehicle according to a first embodiment of the present invention.

Hereinafter, embodiments of the present invention will be described with reference to the drawings. In the description below, the same elements have the same reference characters allotted. They are named and function identically. Therefore, detailed description thereof will not be repeated.

First Embodiment

Referring to FIG. 1, a block diagram representing an entire vehicle 1 according to the present embodiment will be described. Vehicle 1 includes an engine 10, a drive shaft 16, a first motor generator (hereinafter, referred to as "first MG") 20, a second motor generator (hereinafter, referred to as "second MG") 30, a power split device 40, a reducer 58, a PCU (Power Control Unit) 60, a battery 70, drive wheels 80, a start switch 150, and an ECU (Electronic Control Unit) 200.

ECU 200 is connected with an engine rotational speed sensor 11, a first resolver 12, a second resolver 13, a wheel speed sensor 14, a battery temperature sensor 156, a current sensor 158, a voltage sensor 160, an accelerator pedal position sensor 172, a brake pedal force sensor 176, and a shift position sensor 180.

Vehicle 1 runs with a drive force applied by at least one of engine 10 and second MG30. Power generated by engine 10 is split into two paths by power split device 40. One of the two paths transmits the power to drive wheels 80 through reducer 58, and the other path transmits the power to first MG20.

First MG20 and second MG30 are, for example, 3-phase alternating current rotating electric machines. First MG20 and second MG30 are driven by PCU 60.

First MG20 has a function of a generator for generating electricity with use of the power of engine 10 split by power split device 40 and charging battery 70 through PCU 60. Further, first MG20 receives electric power from battery 70 and rotates a crankshaft as an output shaft of engine 10. Accordingly, first MG20 has a function of a starter for starting engine 10.

Second MG30 has a function of a drive motor for providing a drive force to drive wheels 80 with use of at least any one of electric power stored in battery 70 and electric power generated by first MG20. Further, second MG30 has a function of a generator for charging battery 70 through PCU 60 with use of electric power generated by regenerative braking.

Engine 10 is an internal combustion engine such as a gasoline engine, a diesel engine, or the like. Engine 10 includes a plurality of cylinders 102 and a fuel injection device 104 supplying fuel to each of the plurality of cylinders 102. Fuel injection device 104 injects an appropriate amount of fuel to each cylinder at an appropriate timing and stops fuel injection to each cylinder in accordance with a control signal S1 transmitted from ECU 200.

Further, engine 10 is provided with engine rotational speed sensor 11 for detecting a rotational speed (hereinafter, referred to as "engine rotational speed") Ne of the crankshaft of engine 10. Engine rotational speed sensor 11 transmits a signal indicating a detected engine rotational speed Ne to ECU 200.

Power split device 40 mechanically connects three elements, i.e. drive shaft 16 for rotating drive wheel 80, an output shaft of engine 10, and a rotational shaft of first MG20. Power split device 40 uses at least one of the above-described three elements as a reactive force element to enable transmission of power between the other two elements. The rotational shaft of second MG30 is connected to drive shaft 16.

Power split device 40 is a planetary gear mechanism including a sun gear 50, a pinion gear 52, a carrier 54, and a ring gear 56. Pinion gear 52 is in mesh with each of sun gear 50 and ring gear 56. Carrier 54 supports pinion gear 52 rotatably and is connected to the crankshaft of engine 10. Sun gear 50 is connected to the rotational shaft of first MG20. Ring gear 56 is connected to the rotational shaft of second MG30 and reducer 58 through drive shaft 16 provided therebetween.

Reducer 58 transmits power from power split device 40 and/or second MG30 to drive wheels 80. Further, reducer 58 transmits a reactive force applied to drive wheels 80 from a road surface to power split device 40 and second MG30.

PCU 60 converts direct current power stored in battery 70 into alternate current power for driving first MG20 and second MG30. PCU 60 includes a converter and an inverter (none of these are illustrated) controlled in accordance with a control signal S2 transmitted from ECU 200. The converter boosts voltage of the direct current power received from battery 70 and outputs the same to the inverter. The inverter converts the direct current power output from the converter into alternate current power and outputs the same to first MG20 and/or second MG30. Accordingly, electric power stored in battery 70 is used to drive first MG20 and/or second MG30. Further, the inverter converts the alternate current power generated by first MG20 and/or second MG30 into direct current power and applies the same to the converter. The converter steps down the voltage of the direct current power applied by the inverter and outputs the same to battery 70. Accordingly, the electric power generated by first MG20 and/or second MG30 is used to charge battery 70. The converter may be omitted.

Battery 70 serves as a power storage device and as a rechargeable direct current power supply. A secondary battery such as a nickel-metal hydride battery, a lithium-ion battery, or the like is used as battery 70. The voltage of battery 70 is, for example, approximately 200V. Battery 70 may be charged with use of the electric power generated by first MG20 and/or second MG30 as described above, and may also be charged with use of electric power supplied from an external power supply (not illustrated). Battery 70 is not limited to a secondary battery, and it may be a capacitor, a solar cell, a fuel cell, or the like capable of generating direct current voltage.

Battery 70 is provided with a battery temperature sensor for detecting a battery temperature TB of battery 70 and a current sensor 158 for detecting a current IB of battery 70, and a voltage sensor 160 for detecting a voltage VB of battery 70.

Battery temperature sensor 156 transmits a signal indicating battery temperature TB to ECU 200. Current sensor 158 transmits a signal indicating current IB to ECU 200. Voltage sensor 160 transmits a signal indicating voltage VB to ECU 200.

Start switch 150 is, for example, a push-type switch. In the following description, a state where start switch 150 is operated indicates a state where the switch is pushed. Start switch 150 may be a type of inserting a key into a key cylinder and rotating the key to a predetermined position. Start switch 150 is connected to ECU 200. In response to operation of start switch 150 by a driver, start switch 150 transmits a signal ST to ECU 200.

For example, when ECU 200 receives signal ST while the system of vehicle 1 is in a stopped state, ECU 200 determines reception of an instruction to activate the system and shifts the system of vehicle 1 from the stopped state to an activated state. Further, when ECU 200 receives signal ST while the system of vehicle 1 is in the activated state, ECU 200 determines reception of an instruction to stop the system and shifts the system of vehicle 1 from the activated state to the stopped state. In the following description, operation of start switch 150 by a driver when the system of vehicle 1 is in the activated state will be referred to as "IG-OFF operation," and operation of start switch 150 by the driver when the system of vehicle 1 is in the stopped state will be referred to as "IG-ON operation." Further, when the system of vehicle 1 is shifted to the activated state, electric power is supplied to a plurality of equipments necessary for running of vehicle 1, so that the plurality of equipment are shifted to an operable state. On the other hand, when the system of vehicle 1 is shifted to the stopped state, supply of electric power to some of the plurality of equipment necessary for running of vehicle 1 is stopped, so that some equipment are shifted to an operation stopped state.

First resolver 12 is provided in first MG20. First resolver 12 detects a rotational speed Nm1 of first MG20. First resolver 12 transmits a signal indicating detected rotational speed Nm1 to ECU 200.

Second resolver 13 is provided in second MG30. Second resolver 13 detects a rotational speed Nm2 of second MG30. Second resolver 13 transmits a signal indicating detected rotational speed Nm2 to ECU 200.

Wheel speed sensor 14 detects a rotational speed Nw of drive wheels 80. Wheel speed sensor 14 transmits a signal indicating detected rotational speed Nw to ECU 200. ECU 200 calculates a vehicle speed V in accordance with received rotational speed Nw. ECU 200 may calculate vehicle speed V in accordance with rotational speed Nm2 of second MG30 in place of rotational speed Nw.

Accelerator pedal position sensor 172 detects a pressing amount AP on accelerator pedal 170 provided at a driver's seat of vehicle 1. Accelerator pedal position sensor 172 transmits a signal indicating the pressing amount AP on accelerator pedal 170 ECU 200.

Brake pedal force sensor 176 detects a force BK of a driver with respect to brake pedal 174 provided at the driver's seat of vehicle 1. Brake pedal force sensor 176 may, for example, detect a hydraulic pressure of a brake master cylinder. Brake pedal force sensor 176 transmits a signal indicating a force BK to ECU 200.

A brake pedal position sensor detecting a pressing amount on brake pedal 174, a brake switch attaining an on-state when the pressing amount on brake pedal 174 exceeds a threshold value and attaining an off-state when the pressing amount is equal to or less than the threshold value, or the like may be used in place of brake pedal force sensor 176.

Shift position sensor 180 detects a shift position currently selected among a plurality of shift positions. Shift position sensor 180 transmits a signal SHT indicating a position of shift lever 178 to ECU 200.

The plurality of shift positions include, for example, a forward running position (hereinafter, referred to as "D position") and a neutral position (hereinafter, referred to as "N position"). The plurality of shift positions may further include a parking position and a backward running position.

ECU 200 generates a control signal S1 for controlling engine 10, and outputs generated control signal S1 to engine 10. Further, ECU 200 generates a control signal S2 for controlling PCU 60, and outputs generated control signal S2 to PCU 60.

ECU 200 controls an operational state of an entire hybrid system, and particularly controls charging and discharging states of battery 70 and operational states of engine 10, first MG20, and second MG30 so that vehicle 1 can be operated most efficiently by the control of engine 10, PCU 60, and the like.

ECU 200 calculates a requested drive force corresponding to the pressing amount on an accelerator pedal (not illustrated) provided at a driver's seat. ECU 200 controls the torque of first MG20 and second MG30 and an output of engine 10 in accordance with the calculated requested drive force.

Vehicle 1 having the configuration described above runs only with use of second MG30 when efficiency of engine 10 is not good at startup and during low-speed running. During normal running, power split device 40 splits power of engine 10 into two paths. The force on one path directly drives drive wheels 80. The force on the other path drives first MG20 to generate electric power. At this time, ECU 200 drives second MG30 with use of the generated electric power. Driving second MG30 in such a manner supports driving of drive wheels 80.

At the time of decelerating vehicle 1, second MG30 driven by rotation of drive wheels 80 serves as a generator to perform regenerative braking. Electric power collected by the regenerative braking is stored in battery 70. When the remaining amount in power storage device (will be referred to as "SOC" (State of Charge) in the following description) is lowered, and power charging is particularly required, an output of engine 10 is increased to increase the amount of power generated by first MG20. Accordingly, the SOC of battery 70 increases. Further, in some cases, ECU 200 performs control of increasing a drive force from engine 10 as needed even during low-speed running. For example, it is applicable to the case of requiring charging of battery 70, the case of driving an auxiliary machine such as an air conditioner as described above, and the case of raising the temperature of coolant water or engine 10 to a predetermined temperature, and the like.

When controlling a charging amount and a discharging amount of battery 70, ECU 200 sets input electric power acceptable at the time of charging battery 70 (in the following description, referred to as "charging power upper limit Win") and output electric power acceptable at the time of discharging of battery 70 (in the following description, referred to as "discharging power upper limit Wout"), in accordance with a current SOC and battery temperature TB. For example, when the current SOC is lowered, discharging power upper limit Wout is lowered gradually. On the other hand, when the current SOC is raised, charging power upper limit Win is lowered gradually.

Further, a secondary battery used as battery 70 has temperature dependency causing internal resistance to be raised when the temperature is low. Further, when the temperature is high, prevention of excessive rise in temperature due to further generation of heat is required. Therefore, at the time when battery temperature TB is low and high, discharging power upper limit Wout and charging power upper limit Win are preferably lowered. ECU 200 uses, for example, a map in accordance with battery temperature TB and current SOC to set charging power upper limit Win and discharging power upper limit Wout.

When a driver operates start switch 150 during running of vehicle 1 having the configuration described above, the system of vehicle 1 is desirably activated or stopped in accordance with the intention of the driver. However, in some cases, the intention of the driver cannot be recognized accurately only by an operational state of start switch 150.

In the present embodiment, ECU 200 stops the system of vehicle 1 when a determination condition is satisfied, where the determination condition is adapted for determining reception of an instruction to stop the system of vehicle 1 in accordance with an operational state of start switch 150. Further, when start switch 150 is operated during running of vehicle 1 with the system in the activated state, ECU 200 modifies the determination condition in accordance with an operational state of an operating unit for changing a running state of vehicle 1.

In the present embodiment, the determination condition for determining reception of an instruction to stop the system of vehicle 1 includes a condition that a duration of operation to start switch 150 is equal to or greater than a threshold value.

Further, in the present embodiment, the operating unit for changing a running state of vehicle 1 is brake pedal 174. Further, the operational state of the operating unit includes a state where the brake is in an on-state and a state where the brake is in an off-state.

Figure 2:
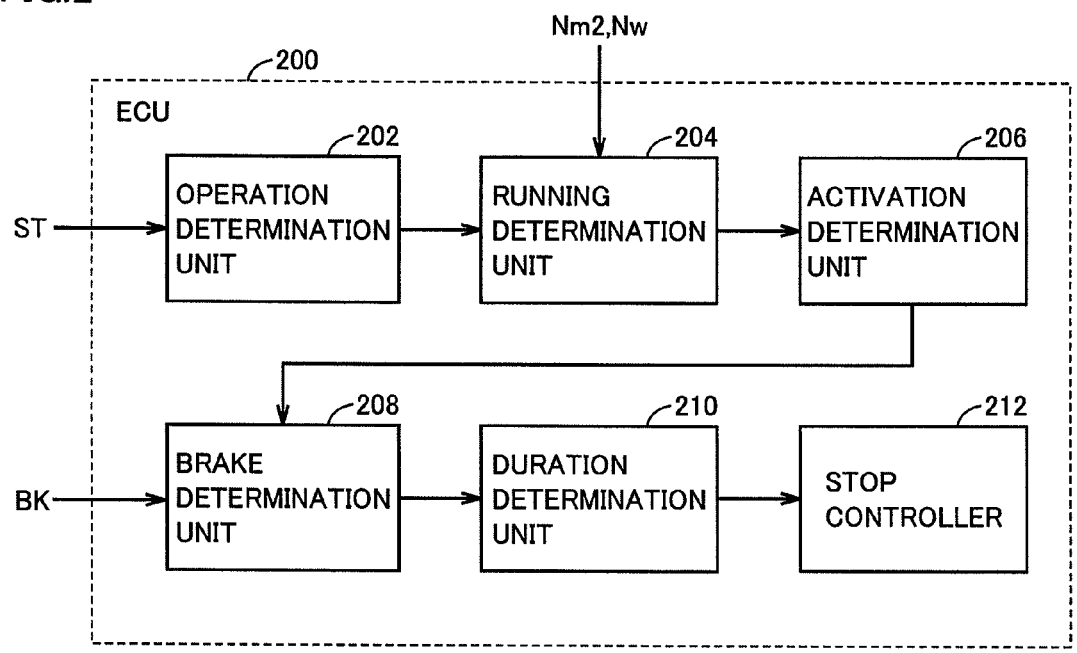
FIG. 2 is a functional block diagram of an ECU provided on a vehicle according to the first embodiment.

FIG. 2 represents a functional block diagram of ECU 200 provided on the vehicle according to the present embodiment. ECU 200 includes an operation determination unit 202, a running determination unit 204, an activation determination unit 206, a brake determination unit 208, a duration determination unit 210, and a stop controller 212.

Operation determination unit 202 determines whether or not start switch 150 is operated. Operation determination unit 202 determines that start switch 150 is operated when it receives signal ST from start switch 150. For example, operation determination unit 202 may turn on an operation determination flag when start switch 150 is operated.

Running determination unit 204 determines whether or not vehicle 1 is running. Running determination unit 204 determines that vehicle 1 is running when vehicle speed V is greater than a predetermined vehicle speed V (0). For example, running determination unit 204 may turn on a running determination flag when vehicle 1 is determined to be running. Predetermined vehicle speed V (0) is a threshold value of vehicle speed V for determining whether or not vehicle 1 is running.

Activation determination unit 206 determines whether or not the system of vehicle 1 is in the activated state. For example, activation determination unit 206 may determine whether or not the system of vehicle 1 is in the activated state in accordance with a state of a flag which is turned on with activation of the system of vehicle 1. For example, activation determination unit 206 may turn on an activation determination flag when the system of vehicle 1 is determined to be in the activated state.

When the system of vehicle 1 is in the activated state, and start switch 150 is operated during running of vehicle 1, brake determination unit 208 determines whether or not the brake is in the on-state. Brake determination unit 208 determines that the brake is in the on-state when force BK with respect to brake pedal 174 is greater than a threshold value BK (0). Further, brake determination unit 208 determines that the brake is in an off-state when force BK is equal to or less than threshold value BK (0).

Brake determination unit 208 may determine whether or not the brake is in the on-state when the operation determination flag, the running determination flag, and the activation determination flag are all in the on-state, and may turn on the brake determination flag upon determining that the brake is in the on-state When brake determination unit 208 determines that the brake is in the off-state, duration determination unit 210 determines whether or not a time period Tc during which start switch 150 is continuously operated (hereinafter, will be referred to as "operation duration") is equal to or greater than a threshold value Tc (0). When the brake is determined to be in the on-state, and operation duration Tc is equal to or greater than threshold value Tc (0), duration determination unit 210 determines reception of an instruction to stop the system of vehicle 1.

When brake determination unit 208 determines that the brake is in the off-state, duration determination unit 210 determines whether or not operation duration Tc is equal to or greater than a threshold value Tc (1). When the brake is determined to be in the off-state, and operation duration Tc is equal to or greater than threshold value Tc (1), duration determination unit 210 determines reception of an instruction to stop the system of vehicle 1.

Threshold value Tc (1) is a value greater than threshold value Tc (0). For example, in the present embodiment, threshold value Tc (0) is two seconds, and the threshold value Tc (1) is five seconds. However, the time periods are not limited to these values.

For example, when the brake determination flag is in the on-state, duration determination unit 210 may determine whether or not operation duration Tc is equal to or greater than the threshold value Tc (0). When operation duration Tc is equal to or greater than threshold value Tc (0), duration determination unit 210 may turn on the duration determination flag.

Alternatively, for example, when the brake determination flag is in the off-state, duration determination unit 210 may determine whether or not operation duration Tc is equal to or greater than threshold value Tc (1). When operation duration Tc is determined to be equal to or greater than threshold value Tc (1), duration determination unit 210 may turn on the duration determination flag.

When duration determination unit 210 determines reception of an instruction to stop the system of vehicle 1, stop controller 212 shifts the system of vehicle 1 from the activated state to the stopped state. For example, when the duration determination flag is in the on-state, stop controller 212 may shift the system of vehicle 1 from the activated state to the stopped state.

In the present embodiment, operation determination unit 202, running determination unit 204, activation determination unit 206, brake determination unit 208, duration determination unit 210, and stop controller 212 are all described as functions of software implemented by a CPU of ECU 200 executing a program stored in a memory. However, they may be realized also by hardware. Such a program is recorded on a storage medium and loaded on a vehicle.

Figure 3:
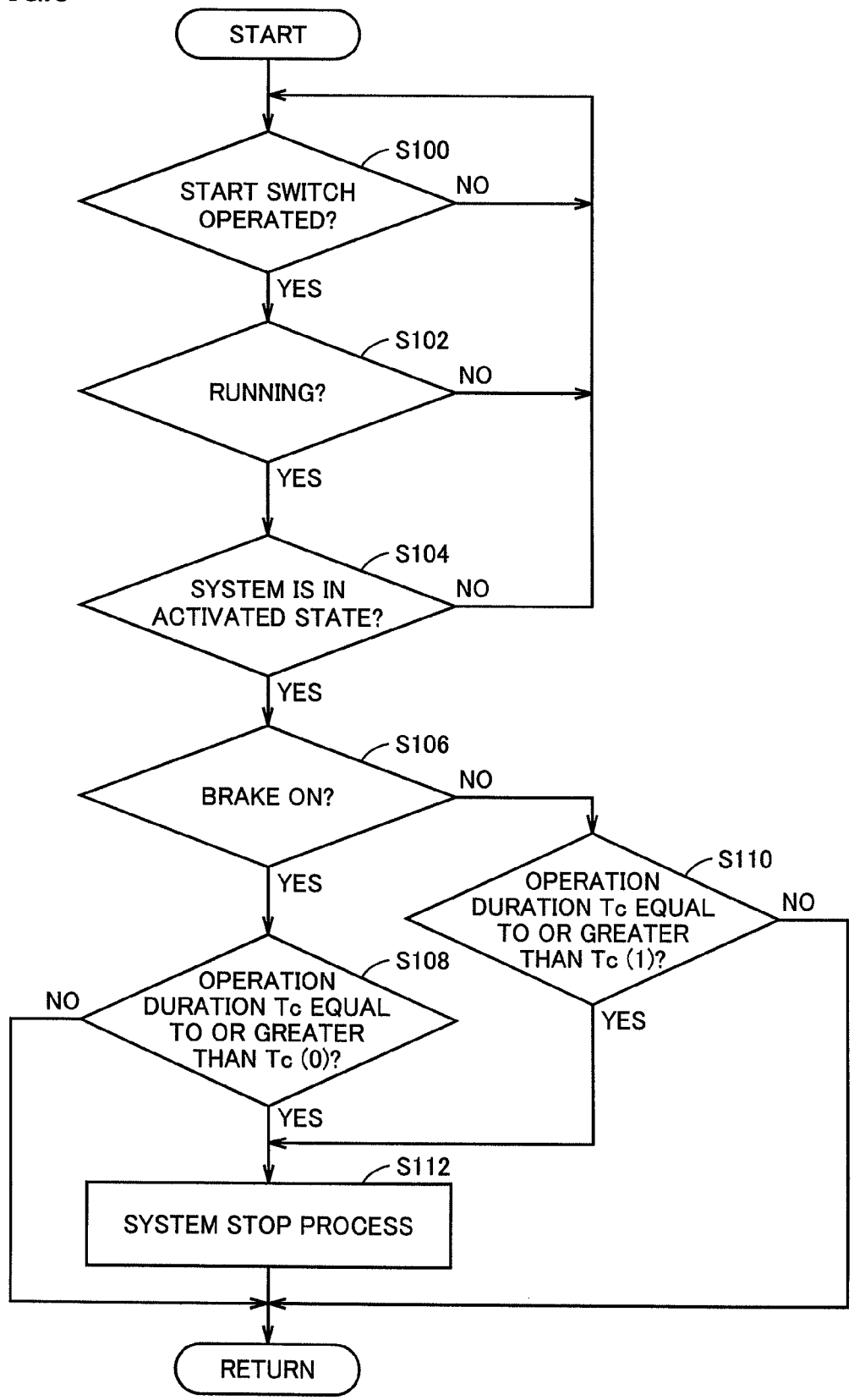
FIG. 3 is a flowchart representing a control structure of a program executed by the ECU provided on the vehicle according to the first embodiment.

Referring to FIG. 3, a control structure of the program executed by ECU 200 provided on the vehicle according to the present embodiment will be described.

In step (hereinafter, "step" is identified as "S") 100, ECU 200 determines whether or not start switch 150 is operated. When start switch 150 is operated (YES in S100), the process proceeds to S102. If not so (NO in S100), the process returns to S100.

In S102, ECU 200 determines whether or not vehicle 1 is running. When vehicle speed V of vehicle 1 is equal to or greater than predetermined vehicle speed V (0), ECU 200 determines that vehicle 1 is running. When vehicle 1 is running (YES in S102), the process proceeds to S104. If not so (NO in S102), the process returns to S100.

In S104, ECU 200 determines whether or not the system of vehicle 1 is in the activated state. When the system of vehicle 1 is in the activated state (YES in S104), the process proceeds to S106. If not so (NO in S104), the process returns to S100.

In S106, ECU 200 determines whether or not the brake is in the on-state. When the brake is in the on-state (YES in S106), the process proceeds to S108. If not so (NO in S106), the process proceeds to S112.

In S108, ECU 200 determines whether or not operation duration Tc is equal to or greater than threshold value Tc (0). When operation duration Tc is equal to or greater than threshold value Tc (0) (YES in S108), the process proceeds to S112. If not so (NO in S108), the process is terminated.

In S110, ECU 200 determines whether or not operation duration Tc is equal to or greater than threshold value Tc (1). When operation duration Tc is equal to or greater than threshold value Tc (1) (YES in S110), the process proceeds to S112. If not so (NO in S110), the process is terminated. In S112, ECU 200 shifts the system of vehicle 1 from the activated state to the stopped state.

Operation of ECU 200 provided on vehicle 1 according to the present embodiment based on the structure and the flowchart described above will be described with reference to FIG. 4.

For example, the case is assumed where vehicle 1 is running at a speed higher than predetermined vehicle speed V (0) in the state where the system of vehicle 1 is activated.

When start switch 150 is operated by a driver at the time T (0) (YES in S100), vehicle 1 is running (YES in S102), and the system of vehicle 1 is in the activated state (YES in S104). Therefore, a determination is made as to whether or not the brake is in the on-state (S106). When the brake is in the on-state as indicated by the solid line in FIG. 4 (YES in S106), a determination is made as to whether or not operation duration Tc is equal to or greater than threshold value Tc (0) (S108).

When operation duration Tc is equal to or greater than threshold value Tc (0) at the time T (1) (YES in S108), the system of vehicle 1 is shifted from the activated state to the stopped state.

Figure 4:
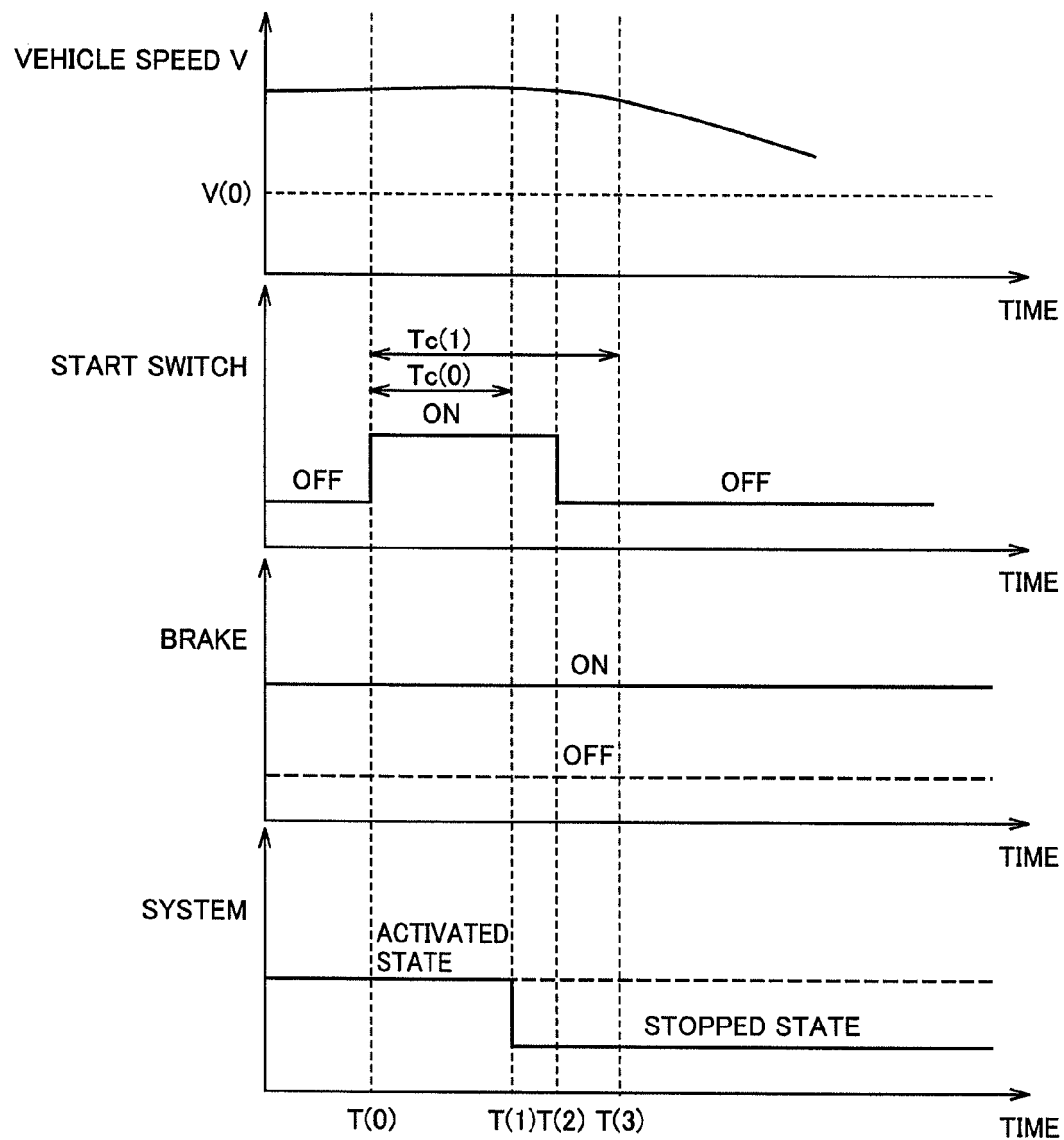
FIG. 4 is a timing chart representing an operation of the ECU provided on the vehicle according to the first embodiment.

On the other hand, when the brake is in the off-state as indicated by the bold dashed line in FIG. 4 (NO in S106), a determination is made as to whether or not operation duration Tc is equal to or greater than threshold value Tc (1) (S110). When the driver stops operating start switch 150 at the time T (2) before reaching the time T (3) (in other words, the driver performed operation to turn off start switch 150) (NO in S108), ECU 200 maintains the activated state of the system of vehicle 1. The time T (3) corresponds to an elapse of Tc (1) from time T (0).

As described above, according to the vehicle of the present embodiment, when start switch 150 is operated during running while the brake is in the on-state, a determination is made that a driver attempts to stop the system of vehicle 1 more actively than in the case where the brake is in the off-state. Therefore, by setting the threshold value of operation duration Tc for the case where the brake is in the on-state to be shorter than in the case where the brake is in the off-state, a determination on reception of an instruction to stop the system can be made promptly. Therefore, a vehicle and a method for controlling a vehicle can be provided to stop the system in accordance with the intention of a driver during running of the vehicle.

In FIG. 1, vehicle 1 is illustrated that front wheels are drive wheels 80. However, the drive system is not particularly limited to this. For example, rear wheels of vehicle 1 may be drive wheels. Alternatively, vehicle 1 may be a vehicle without any one of first MG20 and second MG30 of FIG. 1. Further, vehicle 1 may be a vehicle having second MG30 of FIG. 1 connected to a drive shaft for driving rear wheels instead of being connected to drive shaft 16 of front wheels. Further, a transmission mechanism may be provided between drive shaft 16 and reducer 58 or between drive shaft 16 and second MG30.

Alternatively, vehicle 1 may have a configuration in which second MG30 is omitted, the rotation shaft of first MG20 is connected to the output shaft of engine 10, and a transmission having a clutch is provided in place of power split device 40.

In the case where a brake pedal position sensor is used in place of brake pedal force sensor 176, brake determination unit 208 may determine that the brake is in the on-state when a pressing amount on brake pedal 174 is greater than a threshold value, and may determine that the brake is in the off-state when the pressing amount is equal to or less than the threshold value.

Alternatively, in the case where the brake switch is used in place of brake pedal force sensor 176, brake determination unit 208 may determine that the brake is in the on-state when the brake switch is the on-state, and may determine that the brake is in the off-state when the brake switch is in the off-state.

The present embodiment illustrates that the determination condition can be changed in accordance with the on-state and the off-state of the brake when start switch 150 is operated during running of vehicle 1. However, the determination condition for the case where start switch 150 is operated during stopping of vehicle 1 may be different from the determination condition corresponding to the on-state and the off-state of the brake.

For example, when start switch 150 is operated during vehicle 1 being stopped, the threshold value of operation duration Tc may be set to have a time longer than time Tc (1) or shorter than threshold value Tc (0).

Alternatively, the determination condition for the case where start switch 150 is operated during vehicle 1 being stopped, a condition may be the same as the determination condition corresponding to any one of the on-state and the off-state of the brake.

Second Embodiment

Hereinafter, a vehicle according to a second embodiment will be described. As compared to the configuration of the vehicle according to the first embodiment described above, the vehicle according to the present embodiment is different in operation of ECU 200. The configuration other than the operation of ECU 200 is the same as the configuration of vehicle 1 according to the first embodiment described above. The same configuration has the same reference numerals allotted. Functions of the same configuration are also the same. Therefore, detailed description regarding the same configuration will not be repeated.

In the present embodiment, the determination condition for determining reception of an instruction to stop the system of vehicle 1 includes a condition that the number of operations to start switch 150 is equal to or greater than a threshold value.

Figure 5:
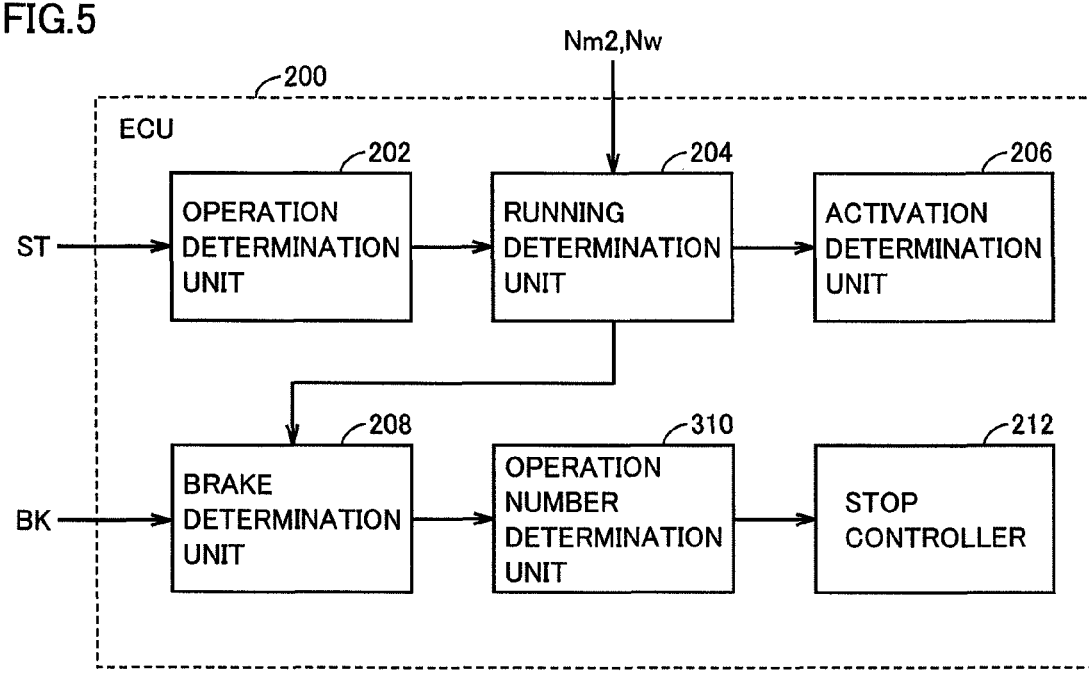
FIG. 5 is a functional block diagram of an ECU provided on a vehicle according to a second embodiment.

FIG. 5 is a functional block diagram of ECU 200 provided on vehicle 1 according to the present embodiment. As compared to the configuration of the functional diagram of ECU 200 shown in FIG. 2, the functional block diagram of ECU 200 shown in FIG. 5 is different in that ECU 200 includes an operation number determination unit 310 in place of duration determination unit 210. Other configuration is the same as the configuration of the functional block diagram of ECU 200 shown in FIG. 2. The same configuration has the same reference numerals allotted. Functions of the same configuration are also the same. Therefore, detailed description regarding the same configuration will not be repeated.

When brake determination unit 208 determines that the brake is in the on-state, operation number determination unit 310 determines whether or not the number of operations to start switch 150 within a predetermined time period (hereinafter referred to as operation number) Na is equal to or greater than a threshold value Na (0). In the present embodiment, the number of operations to start switch 150 corresponds to the number of times start switch 150 is pushed.

When the brake is determined to be in the on-state, and operation number Na is equal to or greater than threshold value Na (0), operation number determination unit 310 determines reception of an instruction to stop the system of vehicle 1. The predetermined time period is set such that the continuous number of operation to start switch 150 can be specified.

When brake determination unit 208 determines that the brake is in the off-state, operation number determination unit 310 determines whether or not operation number Na is equal to or greater than a threshold value Na (1). When the brake is determined to be in the off-state, and operation number Na is equal to or greater than threshold value Na (1), operation number determination unit 310 determines reception of an instruction to stop the system of vehicle 1.

Threshold value Na (1) is a value greater than threshold value Na (0). For example, in the present embodiment, threshold value Na (0) is two times, and threshold value Na (1) is three times. However, the numbers are not limited to these values.

For example, when a brake determination flag is in the on-state, operation number determination unit 310 may determine whether or not operation number Na is equal to or greater than threshold value Na (0). When operation number Na is equal to or greater than threshold value Na (0), operation number determination unit 310 may turn on the operation number determination flag.

Alternatively, for example, when the brake determination flag is in the off-state, operation number determination unit 310 may determine whether or not operation number Na is equal to or greater than threshold value Na (1). When operation number Na is equal to or greater than threshold value Na (1), operation number determination unit 310 may turn on the operation number determination flag.

In the present embodiment, operation number determination unit 310 is described as a function of software implemented by a CPU of ECU 200 executing a program stored in a memory. However, it may be realized also by hardware.

Figure 6:
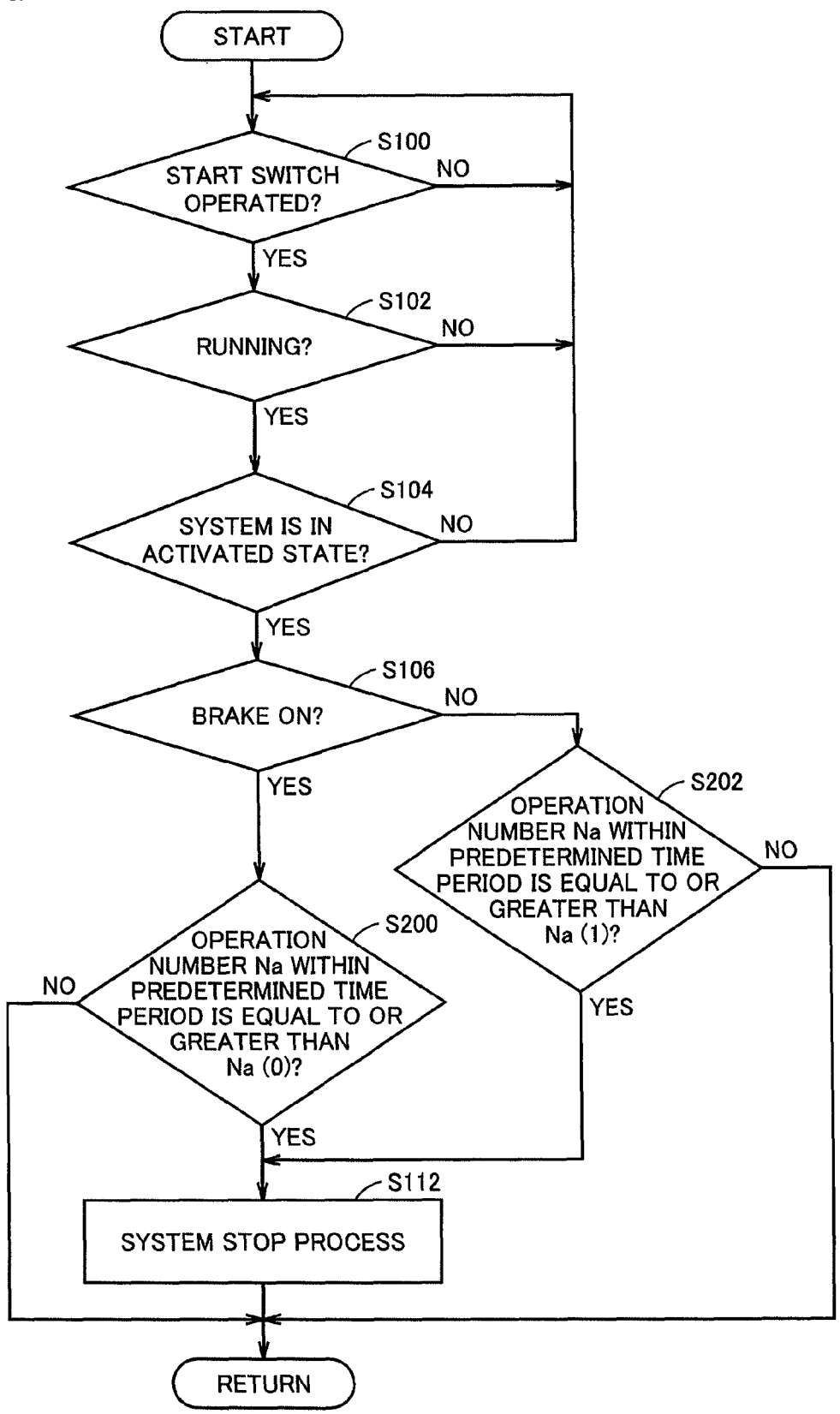
FIG. 6 is a flowchart representing a control structure of a program executed by the ECU provided on the vehicle according to the second embodiment.

Referring to FIG. 6, a control structure of the program executed by ECU 200 provided on the vehicle according to the present embodiment will be described.

In the flowchart shown in FIG. 6, the processes which are the same as those shown in the flowchart of FIG. 3 have the same step numbers allotted. The contents of processes are also the same. Therefore, detailed description regarding the same processes will not be repeated.

When the brake is determined to be in the on-state (YES in S102), ECU determines whether or not operation number Na within the predetermined time period to start switch 150 is equal to or greater than Na (0) in S200. When operation number Na within the predetermined time period to start switch 150 is determined to be equal to or greater than Na (0) (YES in S200), the process proceeds to S112. If not so (NO in S200), the process is terminated.

When the brake is determined to be in the off-state (NO in S102), ECU 200 determines whether or not operation number NA within the predetermined time period to start switch 150 is equal to or greater than Na (1) in S202. When operation number Na within the predetermined time period to start switch 150 is determined to be equal to or greater than Na (1) (YES in S210), the process proceeds to S112. If not so (NO in S210), the process is terminated.

Operation of ECU 200 provided on vehicle 1 according to the present embodiment based on the structure and the flowchart described above will be described.

For example, the case is assumed where vehicle 1 is running at a speed higher than a predetermined vehicle speed V (0) in the state where the system of vehicle 1 is activated.

When start switch 150 is operated by a driver (YES in S100), vehicle 1 is running (YES in S102), and the system of vehicle 1 is in the activated state (YES in S104). Therefore, a determination is made as to whether or not the brake is in the on-state (S106). When the brake is in the on-state (YES in S106), a determination is made as to whether or not operation number Na within the predetermined time period is equal to or greater than Na (0) (S200).

When operation number Na within the predetermined time period is equal to or greater than Na (0) (YES in S200), the system of vehicle 1 is shifted from the activated state to the stopped state. At this stage, supply of fuel to engine 10 is stopped.

On the other hand, when the brake is in the off-state (NO in S106), a determination is made as to whether or not operation number Na within the predetermined time period is equal to or greater than Na (1) (S202). When operation number Na within the predetermined time period is equal to or less than Na (0) (NO in S202), ECU 200 maintains the activated state of the system of vehicle 1.

As described above, according to the vehicle of the present embodiment, when start switch 150 is operated during running while the brake is in the on-state, a determination is made that the driver attempts to stop the system of vehicle 1 more actively than in the case where the brake is in the off-state. Therefore, by setting the threshold value of operation number Na for the case where the brake is in the on-state to be less than in the case where the brake is in the off-state, a determination on reception of an instruction to stop the system can be made promptly. Therefore, a vehicle and a method for controlling a vehicle can be provided to stop the system in accordance with the intention of a drive during running of the vehicle.

The present embodiment has been described based on the case where ECU 200 determines reception of an instruction to stop the system of vehicle 1 when operation number Na within the predetermined time period is greater than the threshold value. However, for example, ECU 200 may determine reception of an instruction to stop the system of vehicle 1 when operation number Na within the predetermined time period matches with the threshold value. In other words, ECU 200 may determine no reception of an instruction to stop the system of vehicle 1 when operation number Na within the predetermined time period is greater than the threshold value or less than the threshold value.

Third Embodiment

Hereinafter, a vehicle according to a third embodiment will be described. As compared to the configuration of the vehicle according to the first embodiment described above, the vehicle according to the present embodiment is different in operation of ECU 200. The configuration other than the operation of ECU 200 is the same as the configuration of vehicle 1 according to the first embodiment described above. The same configuration has the same reference numerals allotted. Functions of the same configuration are also the same. Therefore, detailed description regarding the same configuration will not be repeated.

In the present embodiment, an operating unit for changing a running state of vehicle 1 is a shift lever 178. Further, an operational state of the operating unit includes a state where a running position is selected and a state where a neutral position is selected.

Figure 7:
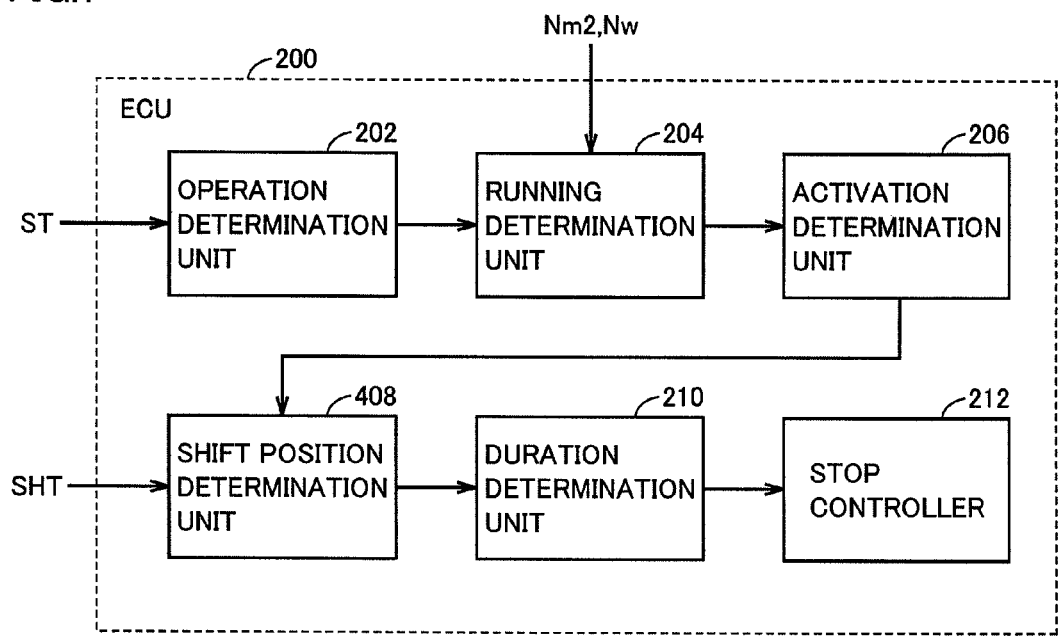
FIG. 7 is a functional block diagram of an ECU provided on a vehicle according to a third embodiment.

FIG. 7 is a functional block diagram of ECU 200 provided on vehicle 1 according to the present embodiment. As compared to the configuration of the functional block diagram of ECU 200 shown in FIG. 2, the functional block diagram of ECU 200 shown in FIG. 7 is different in that a shift position determination unit 408 is provided in place of brake determination unit 208. Other configuration is the same as the configuration of the functional block diagram of ECU 200 except for the point described below. The same configuration has the same reference numerals allotted. Functions of the same configuration are also the same. Therefore, detailed description regarding the same configuration will not be repeated.

As shown in FIG. 7, ECU 200 includes shift position determination unit 408. Shift position determination unit 408 determines whether the shift position is in a D position indicating a forward running position or an N position indicating the shift position of disconnecting transmission of power between engine 10 and drive wheels 80.

Shift position determination unit 408 determines whether the current shift position is the D position or the N position in accordance with a signal SHT received from shift position sensor 180.

When a determination is made that the current shift position is the D position, shift position determination unit 408 may turn on a D position determination flag. When the current shift position is the N position, the shift position determination unit 408 may turn on an N position determination flag.

When shift position determination unit 408 determines that the current shift position is the D position, duration determination unit 210 determines whether or not an operation duration Tc is equal to or greater than a threshold value Tc (0). When a determination is made that the current shift position is the D position, and operation duration Tc is equal to or greater than the threshold value Tc (0), duration determination unit 210 determines reception of an instruction to stop the system of vehicle 1.

When shift position determination unit 408 determines that the current shift position is the N position, duration determination unit 210 determines whether or not operation duration Tc is equal to or greater than a threshold value Tc (1). When a determination is made that a current shift position is the N position, and operation duration Tc is equal to or greater than a threshold value Tc (1), duration determination unit 210 determines reception of an instruction to stop the system of vehicle 1.

Threshold value Tc (1) is a value greater than threshold value Tc (0). For example, in the present embodiment, threshold value Tc (0) is two seconds, and threshold value Tc (1) is five seconds. However, the time periods are not limited to these values.

For example, when the D position determination flag is in the on-state, duration determination unit 210 may determine whether or not operation duration Tc is equal to or greater than threshold value Tc (0). Further, for example, when the N position determination flag is in the on-state, duration determination unit 210 may determine whether or not operation duration Tc is equal to or greater than threshold value Tc (1).

In the present embodiment, shift position determination unit 408 is described as a function of software implemented by a CPU of ECU 200 executing a program stored in a memory. However, it may be realized also by hardware.

Figure 8:
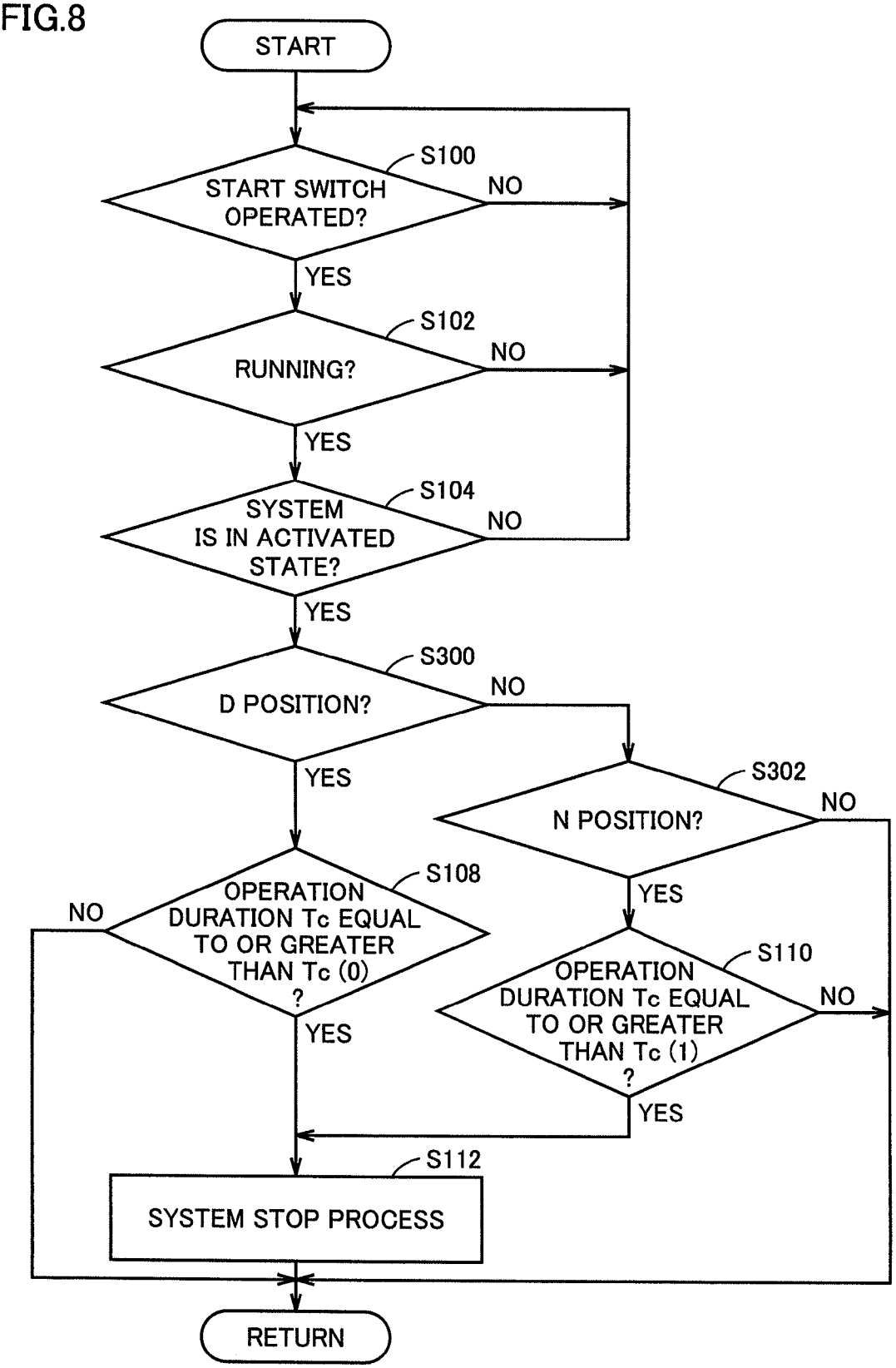
FIG. 8 is a flowchart representing a control structure of a program executed by the ECU provided on the vehicle according to the third embodiment.

Referring to FIG. 8, a control structure of the program executed by ECU 200 provided on the vehicle according to the present embodiment will be described.

In the flowchart shown in FIG. 8, the processes which are the same as those shown in the flowchart of FIG. 3 have the same step numbers allotted. The contents of processes are also the same. Therefore, detailed description regarding the same processes will not be repeated.

When the system of vehicle 1 is determined to be in the activated state (YES in S104), ECU 200 determines whether or not a current shift position is the D position in S300. When the current shift position is the D position (YES in S300), the process proceeds to S108. If not so (NO in S300), the process proceeds to S302.

In S302, ECU 200 determines whether or not the current shift position is the N position. When the current shift position is the N position (YES in S302), the process proceeds to S110. If not so (NO in S302), the process is terminated.

Operation of ECU 200 provided on vehicle 1 according to the present embodiment based on the structure and the flowchart described above will be described.

For example, the case is assumed where vehicle 1 is running at a speed higher than a predetermined vehicle speed V (0) in the state where the system of vehicle 1 is activated.

When start switch 150 is operated by a driver (YES in S100), vehicle 1 is running (YES in S102), and the system of vehicle 1 is in the activated state (YES in S104). Therefore, a determination is made as to whether or not the current shift position is the D position (S300). When the current shift position is the D position (YES in S300), a determination is made as to whether or not operation duration Tc is equal to or greater than threshold value Tc (0) (S108).

When operation duration Tc is equal to or greater than threshold value Tc (0) (YES in S108), the system of vehicle 1 is shifted from the activated state to the stopped state.

On the other hand, when the current shift position is not the D position (NO in S300) but the N position (YES in S302), a determination is made as to whether or not operation duration Tc is equal to or greater than threshold value Tc (1) (S110). When the driver stops operation to start switch 150 before an elapse of time Tc (1) after operation of turning on start switch 150, ECU 200 maintains the activated state of the system of vehicle 1.

As described above, according to the vehicle of the present embodiment, when start switch 150 is operated during running while the current shift position is the D position, a determination can be made that the driver attempts to stop the system of vehicle 1 more actively than in the case where the current shift position is the N position. Therefore, by setting the operation duration Tc in the case of D position to be less than the case of the N position, a determination on reception of an instruction to stop the system can be made promptly. Therefore, a vehicle and a method for controlling a vehicle can be provided to stop the system in accordance with the intention of a driver.

In the present embodiment, the determination condition for determining reception of an instruction to stop includes the condition that the operation duration of start switch 150 is equal to or greater than the threshold value. However, for example, in place of this condition, a condition may be included that operation number Na within a predetermined time period to start switch 150 is equal to or greater than the threshold value.

For example, the determination condition that start switch 150 is operated during running of vehicle 1 while the D position is selected may be a condition that operation number Na within the predetermined time period to start switch 150 is equal to or greater than threshold value Na (0). Further, the determination condition that start switch 150 is operated during running of vehicle 1 while the N position is selected may be a condition that operation number Na within the predetermined time period to start switch 150 is equal to or greater than threshold value Na (1). Threshold value Na (1) is a value greater than threshold value NA (0).

Fourth Embodiment

Hereinafter, a vehicle according to a fourth embodiment will be described. As compared to the configuration of vehicle 1 according to the first embodiment described above, the vehicle according to the present embodiment is different in operation of ECU 200. The configuration other than the operation of ECU 200 is the same as the configuration of vehicle 1 according to the first embodiment described above.

The same configuration has the same reference numerals allotted. Functions of the same configuration are also the same. Therefore, detailed description regarding the same configuration will not be repeated.

In the present embodiment, ECU 200 activates the system of vehicle 1 when a determination condition is satisfied. This determination condition is directed to determining reception of an instruction to activate the system of vehicle 1 in accordance with an operational state of start switch 150. Further, when start switch 150 is operated to be turned on during running of vehicle 1 in the state where the system is stopped, ECU 200 modifies the determination condition in accordance with an operational state of an operating unit for changing a running state of vehicle 1.

In the present embodiment, the determination condition for determining reception of an instruction to activate the system of vehicle 1 includes a condition that a duration of operation to start switch 150 is equal to or greater than a threshold value.

Further, in the present embodiment, the operating unit for changing the running state of vehicle 1 is accelerator pedal 170. Further, the operational state of the operating unit includes a number of operations with a pressing amount AP on accelerator pedal 170 equal to or greater than a predetermined amount. For example, the predetermined amount is, but not limited particularly to, a maximum value.

Figure 9:
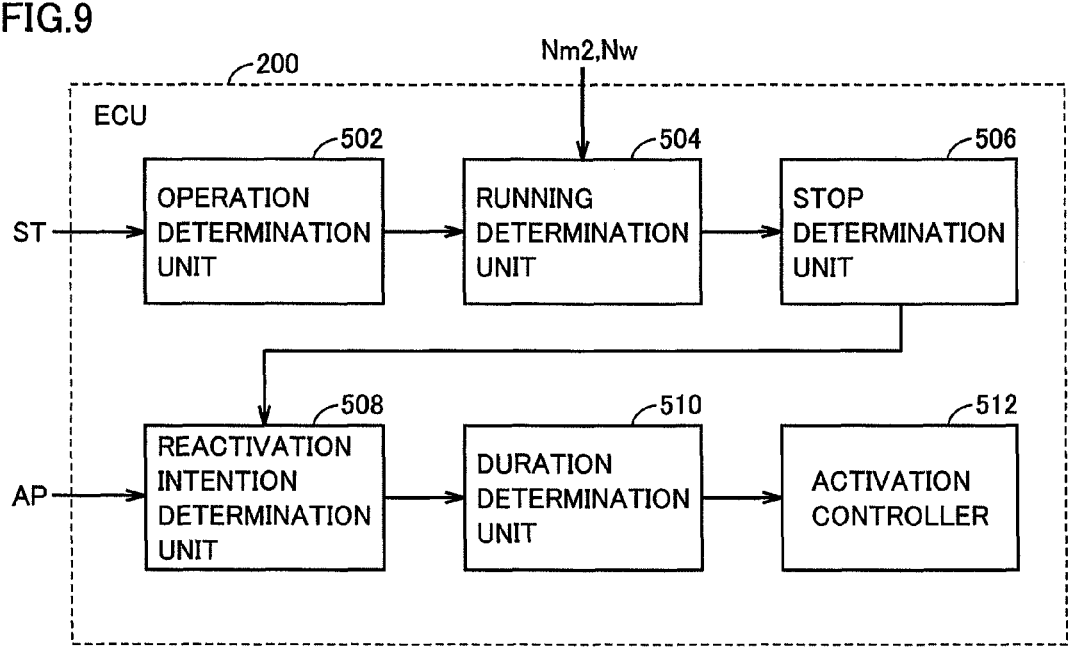
FIG. 9 is a functional block diagram of an ECU provided on a vehicle according to a fourth embodiment.

FIG. 9 is a functional block diagram of ECU 200 provided on vehicle 1 according to the present embodiment. ECU 200 includes an operation determination unit 502, a running determination unit 504, a stop determination unit 506, a reactivation intention determination unit 508, a duration determination unit 510, and a activation controller 512.

Operation determination unit 502 determines whether or not start switch 150 is operated. When signal ST is received from start switch 150, operation determination unit 502 determines that start switch 150 is operated. For example, operation determination unit 502 may turn on an operation determination flag when start switch 150 is operated.

Running determination unit 204 determines whether or not vehicle 1 is running. Running determination unit 204 determines that vehicle 1 is running when a vehicle speed V is greater than a predetermined vehicle speed V (0). For example, running determination unit 204 may turn on the running determination flag when vehicle 1 is determined to be running.

Stop determination unit 506 determines whether or not the system of vehicle 1 is in the stopped state. For example, stop determination unit 506 may determine whether or not the system of vehicle 1 is in the stopped state in accordance with the state of the flag which is turned off upon stopping of system vehicle 1. For example, stop determination unit 506 may turn on the stop determination flag when the system of vehicle 1 is in the stopped state.

When the system of vehicle 1 is in the activated state, and start switch 150 is operated during running of vehicle 1, reactivation intention determination unit 508 determines whether or not a driver is attempting to reactivate the system of vehicle 1 in accordance with the operational state of accelerator pedal 170.

For example, reactivation intention determination unit 508 determines whether or not the number of operations performed until reaching a maximum value of pressing amount AP on accelerator pedal 170 after the time point at which the system of vehicle 1 is shifted from activated state to the stopped state during running (hereinafter, referred to as operation number Nb) is equal to or greater than a threshold value Nb (0). Reactivation intention determination unit 508 determines that the driver is attempting to reactivate the system of vehicle 1 when operation number Nb is equal to or greater than threshold value Nb (0).

For example, when the operation determination flag, the running determination flag, and a stop determination flag are all in the on-state, reactivation intention determination unit 508 determines whether or not the driver is attempting to reactivate the system of vehicle 1. When a determination is made that the driver is attempting to reactivate the system of vehicle 1, and reactivation intention determination unit 508 may turn on the reactivation intention determination flag.

When reactivation intention determination unit 508 determines that the driver is attempting to reactivate the system of vehicle 1, duration determination unit 510 determines whether or not operation duration Tc is equal to or greater than threshold value Tc (0). When a determination is made that the driver is attempting to reactivate the system of vehicle 1, and operation duration Tc is equal to or greater than threshold value Tc (0), duration determination unit 510 determines reception of an instruction to reactivate the system of vehicle 1.

When reactivation intention determination unit 508 determines that a driver is not attempting to reactivate the system of vehicle 1, duration determination unit 510 determines whether or not the operation duration Tc is equal to or greater than threshold value Tc (1). When a determination is made that the driver is not attempting to reactivate the system of vehicle 1, and operation duration Tc is equal to or greater than threshold value Tc (1), duration determination unit 510 determines reception of an instruction to activate the system of vehicle 1.

Threshold value Tc (1) is a value greater than threshold value Tc (0). For example, in the present embodiment, threshold value Tc (0) is two seconds, and the threshold value Tc (1) is five seconds. However, the time periods are not limited to these values.

For example, when the reactivation intention determination flag is in the on-state, duration determination unit 510 may determine whether or not operation duration Tc is equal to or greater than threshold value Tc (0). When a determination is made that operation duration Tc is equal to or greater than the threshold value Tc (0), duration determination unit 510 may turn on the duration determination flag.

Alternatively, for example, when the reactivation intention determination flag is in the off-state, duration determination unit 510 may determine whether or not operation duration Tc is equal to or greater than threshold value Tc (1). When operation duration Tc is equal to or greater than threshold value Tc (1), duration determination unit 510 may turn on the duration determination flag.

When duration determination unit 510 determines reception of an instruction to activate the system of vehicle 1, activation controller 512 shifts the system of vehicle 1 from the activated state to the stopped state. For example, when the duration determination flag is in the on-state, activation controller 512 may shift the system of vehicle 1 from the activated state to the stopped state.

In the present embodiment, operation determination unit 502, running determination unit 504, stop determination unit 506, reactivation intention determination unit 508, duration determination unit 510, and activation controller 512 may be implemented by a CPU of ECU 200 executing a program stored in a memory. Such a program is recorded on a recording medium and loaded on a vehicle.

Figure 10:
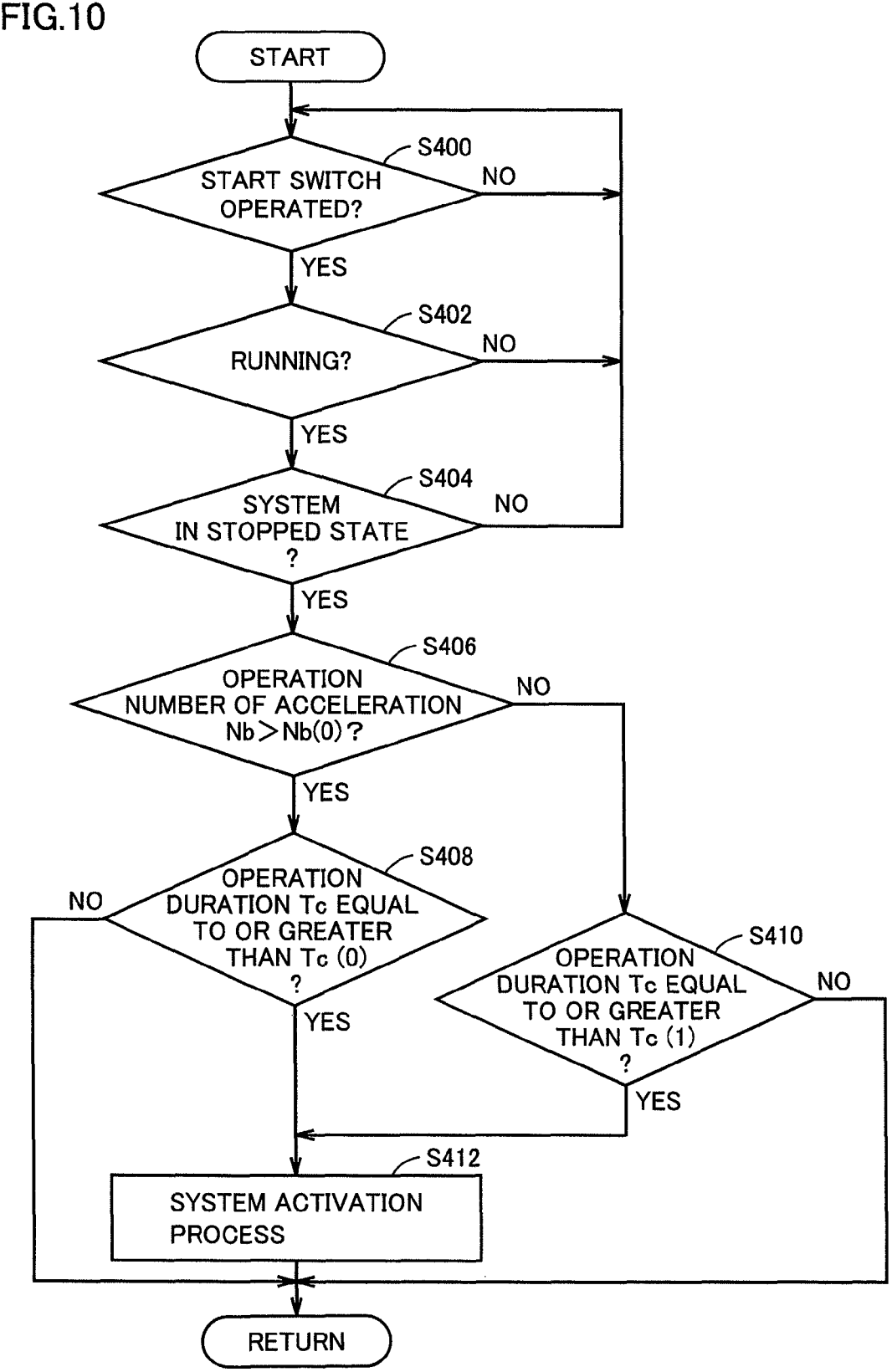
FIG. 10 is a flowchart representing a control structure of a program executed by the ECU provided on the vehicle according to the fourth embodiment.

Referring to FIG. 10, a control structure of the program executed by ECU 200 provided on the vehicle according to the present embodiment will be described.

In S400, ECU 200 determines whether or not start switch 150 is operated. When start switch 150 is operated (YES in S400), the process proceeds to S402. If not so (NO in S400), the process returns to S400.

In S402, ECU 200 determines whether or not vehicle 1 is running. When vehicle speed V of vehicle 1 is equal to or greater than a predetermined vehicle speed V (0), ECU 200 determines that vehicle 1 is running. When vehicle 1 is running (YES in S402), the process proceeds to S404. If not so (NO in S402), the process returns to S400.

In S404, ECU 200 determines whether or not the system of vehicle 1 is in the stopped state. When the system of vehicle 1 is in the stopped state (YES in S404), the process proceeds to S406. If not so (NO in S404), the process returns to S400.

In S406, ECU 200 determines whether or not operation number Nb with pressing amount AP of accelerator pedal 170 reaching a maximum value after the time point at which that system of vehicle 1 is shifted from the activated state to the stopped state is greater than threshold value Nb (0). When operation number Nb is greater than threshold value Nb (0) (YES in S406), the process proceeds to S408. If not so, (NO in S406), the process proceeds to S410.

In S408, ECU 200 determines whether or not operation duration Tc is equal to or greater than threshold value Tc (0). When operation duration Tc is equal to or greater than threshold value Tc (0) (YES in S408), the process proceeds to S412. If not so (NO in S408), the process is terminated.

In S410, ECU 200 determines whether or not operation duration Tc is equal to or greater than threshold value Tc (1). When operation duration Tc is equal to or greater than threshold value Tc (1) (YES in S410), the process proceeds to S412. If not so (NO in S410), the process is terminated.

In S412, ECU 200 shifts the system of vehicle 1 from the stopped state to the activated state.

Operation of ECU 200 provided on the vehicle according to the present embodiment based on the structure and the flowchart described above will be described.

For example, the case is assumed where vehicle 1 is running at a speed greater than predetermined vehicle speed V (0) in the state where the system of vehicle 1 is stopped.

When start switch 150 is operated by the driver (YES in S400), vehicle 1 is running (YES in S402), and the system of vehicle 1 is in the stopped state (YES in S404). Therefore, a determination is made as to whether or not operation number Nb of accelerator pedal 170 is greater than threshold value Nb (0) (S406). When a determination is made that operation number Nb of accelerator pedal 170 is greater than threshold value Nb (0) (YES in S406), a determination is made as to whether or not operation duration Tc is equal to or greater than threshold value Tc (0) (S408).

When operation duration Tc is equal to or greater than threshold value Tc (0) (YES in S408), the system of vehicle 1 is shifted from the stopped state to the activated state.

When operation number Nb of accelerator pedal 170 is equal to or less than threshold value Nb (0) (NO in S406), a determination is made as to whether or not operation duration Tc is equal to or greater than Tc (1) (S410). When the driver stops operation of start switch 150 before an elapse of Tc (1) from turning on start switch 150 (NO in S408), ECU 200 maintains the activated state of the system of vehicle 1.

As described above, according to the vehicle of the present embodiment, when start switch 150 is operated during running of vehicle 1 in a state where the system is stopped, and operation number Nb of accelerator pedal 170 is greater than threshold value Nb (0), a determination can be made that the driver is attempting to reactivate the system of vehicle 1 more actively than the case where accelerator pedal 170 is not operated and the case where brake pedal 174 is operated. Therefore, by setting the threshold value of operation duration Tc in the case where operation number Nb of accelerator pedal 170 is greater than threshold value Nb (0) to be less than the case where operation number Nb is equal to or less than threshold value Nb (0), a determination on reception of an instruction to activate the system can be made promptly. Therefore, a vehicle and a method for controlling the vehicle capable can be provided to activate the system in accordance with the intention of the driver during running of the vehicle.

In the present embodiment, the determination condition for determining reception of an instruction to activate includes the condition that operation duration of start switch 150 is equal to or greater than threshold value. However, for example, a condition may be included that operation number Na within the predetermined time period to start switch 150 is equal to or greater than threshold value.

For example, the determination condition for the case where operation number Nb of accelerator pedal 170 when start switch 150 is operated during running of vehicle 1 is greater than Nb (0) may be a condition that operation number Na within a predetermined time period to start switch 150 is equal to or greater than threshold value Na (0). Further, a determination condition for the case where operation number of accelerator pedal 170 when start switch 150 is operated during running of vehicle 1 is equal to or less than Nb (0) may be the condition that operation number Na within predetermined time period to start switch 150 is equal to or greater than threshold value Na (1). Threshold value Na (1) is a value greater than threshold value Na (0).

It should be understood that the embodiments disclosed herein are illustrative and non-restrictive in every respect. The scope of the present invention is defined by the terms of the claims, rather than the description of the embodiments set forth above, and is intended to include any modifications within the scope and meaning equivalent to the terms of the claims.

REFERENCE SIGNS LIST 1 vehicle; 10 engine; 11 engine rotation speed sensor; 12, 13 resolver; 14 wheel speed sensor; 16 drive shaft; 20, 30 MG; 40 power split device; 50 sun gear; 52 pinion gear; 54 carrier; 56 ring gear; 58 reducer; 60 PCU; 70 battery; 80 drive wheels; 102 cylinder; 104 fuel injection device; 150 start switch; 156 battery temperature sensor; 158 current sensor; 160 voltage sensor; 170 accelerator pedal; 172 accelerator pedal position sensor; 174 brake pedal; 176 brake pedal force sensor; 178 shift lever; 180 shift position sensor; 200 ECU; 202, 502 operation determination unit; 204, 504 running determination unit; 206 activation determination unit; 208 brake determination unit; 201, 510 duration determination unit; 212 stop controller; 310 operation number determination unit; 408 shift position determination unit; 506 stop determination unit; 508 reactivation intention determination unit; 512 activation controller.

The invention claimed is:
1. A vehicle, comprising:
a first operating unit to be operated by a user to instruct a system of the vehicle to stop;
a second operating unit to be operated to change a running state of said vehicle, the second operating unit comprising a brake pedal, an accelerator pedal, or a shift lever for selecting any one of a plurality of shift positions including a running position and a neutral position; and a controller for stopping said system when a determination condition is satisfied, the determination condition adapted for determining reception of an instruction to stop said system in accordance with an operational state of said first operating unit, said controller modifying said determination condition in accordance with an operational state of said second operating unit when said first operating unit is operated by the user during running of said vehicle, and stopping said system when said modified determination condition is satisfied, wherein the stopping said system indicates that the supply of electric power to some equipments of the plurality of equipments necessary for running of vehicle is stopped, so that said some equipments are shifted to an operation stopped state.

2. The vehicle according to claim 1, wherein said second operating unit includes the brake pedal, and said operational state of said second operating unit includes a state where said brake pedal is pressed and a state where pressing on said brake pedal is released, and said determination condition in the state where said brake pedal is pressed includes a condition that a duration of operation to said first operating unit is equal to or greater than a first threshold value, and said determination condition in the state where pressing on said brake pedal is released includes a condition that said duration of operation is equal to or greater than a second threshold value, and said second threshold value is greater than said first threshold value.

3. The vehicle according to claim 1, wherein said second operating unit includes the brake pedal, and said operational state of said second operating unit includes a state where said brake pedal is pressed and a state where pressing on said brake pedal is released, and said determination condition in the state where said brake pedal is pressed includes a condition that a number of operations to said first operating unit within a predetermined time period is equal to or greater than a first threshold value, and said determination condition in the state where pressing on said brake pedal is released includes a condition that said number of operations is equal to or greater than a second threshold value, and said second threshold value is greater than said first threshold value.

4. The vehicle according to claim 2, wherein said controller determines that said brake pedal is pressed when a force of pressing said brake pedal is greater than a predetermined value, and determines that pressing on said brake pedal is released when the force of pressing said brake pedal is less than said predetermined value.

5. The vehicle according to claim 1, wherein said second operating unit includes the shift lever, and said operational state of said second operating unit includes a state where said running position is selected and a state where said neutral position is selected, and said determination condition in the state where said running position is selected includes a condition that a duration of operation to said first operating unit is equal to or greater than a first threshold value, and said determination condition in the state where said usual position is selected includes a condition that said duration of operation is equal to or greater than a second threshold value, and said second threshold value is greater than said first threshold value.

6. The vehicle according to claim 1, wherein said second operating unit includes the shift lever, and said operational state of said second operating unit includes a state where said running position is selected and a state where said neutral position is selected, and said determination condition in the state where said running position is selected includes a condition that a number of operations to said first operating unit within a predetermined time period is equal to or greater than a first threshold value, and said determination condition in the state where said usual position is selected includes a condition that said number of operations is equal to or greater than a second threshold value, and said second threshold value is greater than said first threshold value.

7. A method for controlling a vehicle including a first operating unit to be operated by a user to instruct a system of the vehicle to stop, and a second operating unit to be operated to change a running state of said vehicle, the second operating unit comprising a brake pedal, an accelerator pedal, or a shift lever for selecting any one of a plurality of shift positions including a running position and a neutral position; said method comprising the steps of:

determining whether or not said first operating unit is operated by the user during running of said vehicle;

stopping said system when a determination condition is satisfied, the determination condition adapted for determining reception of an instruction to stop said system in accordance with an operational state of said first operating unit; and modifying said determination condition in accordance with an operational state of said second operating unit when said first operating unit is operated by the user during running of said vehicle, wherein the stopping said system indicates that the supply of electric power to some equipments of the plurality of equipment necessary for running of vehicle is stopped, so that said some equipments are shifted to an operation stopped state.

* * * * *